UNITED STATES PATENT OFFICE.

EDWARD M. LAWRENCE, OF LUBEC, MAINE.

PROCESS OF CANNING SARDINES.

1,170,762. Specification of Letters Patent. Patented Feb. 8, 1916.

No Drawing. Application filed July 30, 1915. Serial No. 42,775.

*To all whom it may concern:*

Be it known that I, EDWARD M. LAWRENCE, a citizen of the United States, residing at Lubec, in the county of Washington and State of Maine, have invented certain new and useful Improvements in Processes of Canning Sardines, of which the following is a specification.

The object of this invention is to improve the quality of the fish and to reduce the cost of canning.

My improved process consists in packing the raw fish in open cans, covering the open tops of the cans with screens to prevent them from dropping out, inverting the cans of fish thus protected, subjecting the fish in the inverted cans to heat, steam or hot air, until the fish are thoroughly sterilized and cooked, allowing them to remain in such inverted position until the water drains out and frying them in hot oil.

It is noted that the fish may be packed in cans before or after they have been eviscerated and decapitated, that any convenient method of holding or transporting the cans and applying the screens to them may be employed, that any desired means of applying heat to the inverted cans may be employed, such, for example, as conveying them through a steam retort or hot oven and that any convenient or suitable method of frying the fish in oil may be employed.

I claim:

The herein described process of canning sardines which consists in packing the raw fish in open cans, covering the open cans with a screen, inverting the open cans, subjecting the fish in the inverted open cans to heat to sterilize and cook them and then frying them in oil.

In testimony whereof I affix my hand this twenty-six day of July, 1915.

EDWARD M. LAWRENCE.